United States Patent Office 3,787,486
Patented Jan. 22, 1974

---

3,787,486
PREPARATION OF HALOETHANE PHOSPHONIC ACIDS
David I. Randall, Calvin Vogel, and Robert W. Wynn, Easton, Pa., assignors to GAF Corporation, New York, N.Y.
No Drawing. Filed Oct. 17, 1969, Ser. No. 867,357
Int. Cl. C07f *9/38*
U.S. Cl. 260—502.4 R        6 Claims

ABSTRACT OF THE DISCLOSURE 2-haloethylphosphonic acids of the formula:

$$X-CH_2CH_2-\overset{\overset{O}{\|}}{\underset{OH}{P}}-OH$$

wherein X is chlorine or bromine, useful as plant growth stimulants, are prepared by hydrolysis of a compound of the formula:

$$X-CH_2CH_2-\overset{\overset{O}{\|}}{\underset{OR_2}{P}}-OR_1$$

wherein X is as above and $R_1$ and $R_2$ are haloalkyl, alkyl or hydroxyalkyl, by treatment with 20–45% aqueous hydrochloric acid under autogenous or greater pressure at a temperature of about 100–145° C.

BACKGROUND OF THE INVENTION

Field of the invention

This invention relates to an improved process for the preparation of 2-haloethylphosphonic acids by hydrolysis of ester precursors.

Description of the prior art 2-haloethylphosphonic acids are known in the art as being valuable as plant growth stimulants in the agricultural field. Thus, these compounds, particularly the chloro compound, have been used extensively as plant growth hormones for increasing crop yields of, for example, pineapples, soy beans and the like. The usefulness of these compounds is illustrated for example in the publication, Nature, vol. 218, p. 974, (1968) by Cooke and Randall.

In preparation of these products, however, the processes known heretofore have not been satisfactory as they have not been able to provide a product of sufficient purity as to obviate all the toxicity effects of impurities normally contained therein. One of the most suitable procedures for the preparation of such compounds is by hydrolysis of the corresponding diester with aqueous HCl. The aqueous hydrochloric acid hydrolysis is a procedure known in the art as illustrated for example in the textbook by Kosolapoff, titled, Organophosphorus Compounds, John Wiley & Sons Inc., New York (1950) p. 139, which indicates that esters of phosphonic acid are readily hydrolyzed by hot hydrochloric or hydrobromic acid at atmospheric pressure. To the present however, none of the processes known for hydrolysis of the diester to the desired 2-haloethylphosphonic acid has been suitable to provide the highly pure products desired.

The art also comprises various methods of cleaving, (rather than hydrolyzing), the corresponding diesters to the desired 2-haloethane phosphonic acids. Thus, in applicants copending application of the same assignee (Ser. No. 628,839, filed Apr. 6, 1967) and now abandoned, there is disclosed a procedure by which the bis (2-chloroethyl) ester of 2-chloroethylphosphonic acid is cleaved to the 2-chloroethane phosphonic acid with anhydrous hydrogen chloride, which process represented a clear advance over the previously known aqueous hydrochloric acid hydrolysis. This cleavage process is actually a double decomposition cleavage or metathesis type reaction and thus is distinct from the prior art hydrolysis. Therefore, the art teaches processes by which the bis (2-chloroethyl) ester of 2-chloroethylphosphonic acid has been either hydrolyzed or cleaved to form the corresponding 2-chloroethylphosphonic acid; however neither of these processes has been successful in providing a sufficiently pure product.

While the anhydrous hydrogen chloride method covered in the copending application mentioned, gives a purer product than does the aqueous hydrochloric acid hydrolysis method, nevertheless the anhydrous method still leaves something to be desired from the standpoint of purity and therefore safety to the ultimate food consumer. This is particularly important because of use of the final product as a plant growth hormone for increasing crop yields in such products as pineapples, soy beans and the like. Quite clearly, harmful or toxic impurities present in appreciable quantities would preclude the use of such foods in normal application.

SUMMARY OF THE INVENTION

It is accordingly one object of this invention to provide a process by which the corresponding diesters may be hydrolyzed to the desired 2-haloethylphosphonic acid in good yields and high purity.

A further object of the invention is to provide a process wherein this hydrolysis reaction may be carried out to form the desired product in high yields while minimizing the formation of undesirable impurities.

A still further object of the invention is to provide a process whereby the bis (esters) of 2-haloethylphosphonic acids may be hydrolyzed with aqueous hydrochloric acid at elevated temperatures and autogenous or greater pressure to provide the desired 2-haloethylphosphonic acid in high yields and maximum purity.

Further objects and advantages of the present invention will become apparent as the description thereof proceeds.

In satisfaction of the foregoing objects and advantages there is provided by this invention a process for the preparation of 2-haloethylphosphonic acids of the formula:

$$X-CH_2CH_2-\overset{\overset{O}{\|}}{\underset{OH}{P}}-OH$$

wherein X is chlorine or bromine, which comprises treating a compound of the formula:

$$X-CH_2CH_2-\overset{\overset{O}{\|}}{\underset{OR_2}{P}}-OR_1$$

wherein X is as above, and $R_1$ and $R_2$ are selected from the group consisting of haloalkyl, preferably of 1 to 8 carbon atoms (e.g. 2-haloethyl), alkyl groups of 1 to 8 carbon atoms and hydroxy alkyl groups of 1 to 8 carbon atoms, with aqueous hydrochloric acid of about 20 to 45% strength under autogenous or greater pressure at a temperature of about 100 to 145° C.

DESCRIPTION OF PREFERRED EMBODIMENTS

As indicated above this invention is concerned with a procedure for hydrolysis of bis esters of the following formula:

$$X-CH_2CH_2-\overset{\overset{O}{\|}}{\underset{OR_2}{P}}-OR_1$$

wherein X is chlorine or bromine and $R_1$ and $R_2$ are selected from the group consisting of haloalkyl of 1 to 8 carbon atoms, e.g. 2-haloethyl such a 2-chloroethyl, alkyl groups of 1 to 8 carbon atoms and hydroxyalkyl groups of 1 to 8 carbon atoms, such as 2-hydroxyethyl, the hydrolysis reaction being conducted in the presence of concentrated hydrochloric acid under very specific conditions as enumerated hereinafter which process operates to produce the desired 2-haloethylphosphonic acids of the formula:

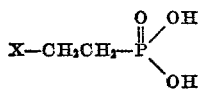

wherein X is chlorine or bromine, in high purity.

As indicated hereinbefore, the prior art aqueous hydrolysis procedure was conducted at atmospheric pressure and resulted in a fairly impure product. Thus this aqueous hydrolysis had the disadvantage that by the time the ester groups had been hydrolyzed off, some of the halogen in the ethane group had been hydrolyzed to hydroxyl so that a substantial amount of 2-hydroxyethanephosphonic acid was present in the product and was therefore a substantial impurity as this compound is an inert material and may also be toxic.

Because of this disadvantage, it was necessary to devise a procedure by which this impurity could be obviated. In the prior application mentioned hereinabove, the use of anhydrous hydrogen chloride was found to be suitable to prevent formation of substantial amounts of the undesirable 2-hydroxyethylphosphonic acid. However it has now been determined that the use of anhydrous hydrogen chloride results in the formation of mono-haloethyl ester of the 2 - chloroethylphosphonic acid in substantial amounts. As it is now known that this monochloroethyl ester is held tenaciously for long periods of time by plant tissue it is therefore a potential danger to the ultimate consumer. The formula of this mono-chloroethyl ester impurity is as follows:

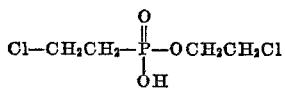

It has been found however, that the use of the anhydrous hydrogen chloride, as claimed in the previous application, can be utilized in order to lower the formation of the mono ester to below a figure of below about 5%. However, in doing so other impurities are introduced. These impurities, amounting to substantially more than 5% of the desired product, are principally the diester of the vinyl acid and oligomers thereof, as exemplified by the following formula:

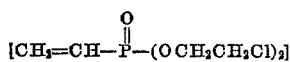

The production of this vinyl acid compound is brought about through the dehydrohalogenation of the diester of the 2-chloroethylphosphonic acid. Hence, the anhydrous HCl method has not been found commercially satisfactory.

It is thus to be understood that hydrolysis of the bis esters of 2-haloethylphosphonic acid of the formula:

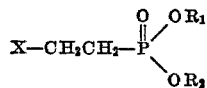

wherein X, $R_1$ and $R_2$ are as defined above, with anhydrous or aqueous HCl will produce the desired 2-halo-ethylphosphonic acid or one or more of the following undesirable impurities:

(a) $X-CH_2CH_2-\underset{\underset{OH}{}}{\overset{\overset{O}{\|}}{P}}\diagup^{OR_1}$, called monoester;

(b) $HO-CH_2CH_2-\underset{\underset{OH}{}}{\overset{\overset{O}{\|}}{P}}\diagup^{OH}$, called hydroxyacid (c) $\left[CH_2=CH-\underset{\underset{OR_2}{}}{\overset{\overset{O}{\|}}{P}}\diagup^{OR_1}\right]_n$ called vinyl ester wherein n is 1 or above, and X, $R_1$ and $R_2$ are as defined It is accordingly highly desirable to provide a process wherein the yields and purity of the desired 2-haloethane phosphonic acid are maximized. The process of the present invention provides these advantages.

As indicated it is very important that the amount of desired 2-haloethylphosphonic acid in the product be precisely measured. In the present invention, this is accomplished by reference to the "ethylene release value" or by evaluation of the ethylene contained in the product. Accordingly, in this invention, the purity of the product will be defined by this "ethylene release value." This is fully explained hereinafter.

It has been found in this connection that one mole of the desired 2-haloethylphosphonic acid yields one mole of ethylene in aqueous base. No other compound in the series of compounds under consideration yields ethylene under these criteria. This includes the mono and diesters of 2-haloethane phosphonic acid and 2-hydroxyethylphosphonic acid. By the known aqueous hydrolytic procedure, a maximum relative ethylene value of 54 is all that can be produced as opposed to a value of 82 for pure 2-haloethylphosphonic acid.

It is therefore to be understood that in defining the products produced by the process, reference will be made to the ethylene release value as a determination of the purity of product produced. To fully understand the method of determination of this ethylene release value, the following is given in explanation therefor with respect to the most desired product, 2-chloroethylphosphonic acid.

The ethylene release value is determined by gas chromatographic measurement of the amount of ethylene released on treating a sample of the product with dilute alkali using a gas chromatograph (Perkin-Elmer 154 C gas chromatograph equipped with thermistors), equipped with a detector sensitive to water and a high count integrator to measure accurately the areas under the ethylene and water peaks.

0.400 gram of the product is weighed accurately into a 10 ml. volumetric flask. If the sample contains 2-chloroethyl phosphonic acid anhydride this material is first hydrolyzed to 2-chloroethylphosphonic acid by adding 2 ml. of distilled water to the sample and permitting it to stand at room temperature for about 15 hours. 5 ml. of 11% (wt./v.) aqueous NaOH are then pipetted into the sample and the 10 ml. volumetric flask filled to the mark with distilled water.

A portion of the sample is then injected into the gas chromatograph and the areas under the ethylene and water peaks (based on the same attenuation) ascertained.

The ethylene release value is the average ethylene area percent, of three analyses, obtained by adding the areas under the ethylene and water peaks and dividing the ethylene area by the sum of both areas.

Since the ethylene release value for highly purified 2-chloroethylphosphonic acid (benzene recrystallization) is 0.82, the percent 2-chloroethylphosphonic acid may be obtained by the following formula:

$$\frac{\text{Average area percent ethylene}}{0.82} \times 100$$

= percent 2-chloroethylphosphonic acid

It has now been discovered that an aqueous hydrochloric acid hydrolysis reaction can be conducted under such conditions that the desired 2-haloethylphosphonic acid is produced in better yields and in higher purity than in either of the methods known heretofore. It has been discovered that a particularly important feature of this hydrolysis process is the use of autogenous or greater pressure for conducting the reaction. It is unexpected that the use of pressures in the reaction would provide the good results obtained; however the use of autogenous or greater pressure in combination with a selective set of reaction conditions as defined herein has been found to provide good yields of the desired product with formation of very little of the undesired products mentioned hereinabove, particularly the monochloroethyl ester and the hydroxylethylphosphonic acid impurities.

The reaction of this invention is carried out by contacting the starting bias ester compound with concentrated aqueous hydrochloric acid under elevated temperatures and under autogenous or greater pressure. The reaction between the starting bis ester and hydrochloric acid theoretically requires 2 moles of hydrochloric acid per mole of starting diester to complete the hydrolysis. However it is highly preferred in this invention to have a slight excess of HCl present because if too little aqueous acid is present, it tends to favor the formation of the hydroxy acid impurity. It is therefore to be understood that a preferred molar ratio of hydrochloric acid per mole of diester to be employed is at least 2.5:1 and highly preferably 3 to 6 moles of hydrochloric acid per mole of diester.

The strength and amount of HCl used in the reaction is quite important. Thus in this invention aqueous HCl of about 20 to 45% strength has been found to operate satisfactorily. While 37% hydrochloric represents the maximum amount of hydrochloric acid that can be absorbed in water at atmospheric pressure, since the reaction is operating under superatmospheric pressure it is possible to operate with stronger hydrochloric acid of up to about 45% strength by adding hydrogen chloride gas under pressure to the 37% aqueous acid. Since the hydrogen chloride is used up during the reaction its strength will decrease during the course of the reaction so that towards the end of the reaction, when strong HCl may cause difficulties in undesirable side reactions, the concentration is down to a safe limit of not much over 37% strength. It can therefore be said that in the present reaction the strength of the HCl may range from about 20 to 45% with a highly preferred range of 20 to 37% aqueous hydrochloric acid for use in the reaction.

The reaction is also conducted under elevated temperatures ranging between about 100° to 145° C. with a more preferred temperature range of 110° to about 130° C. This temperature range is somewhat critical as lower temperatures are apt to result in too much of the monoester remaining in the product while higher temperatures favor the production of too much of the hydroxy acid impurity.

The time period for conducting the hydrolysis reaction varies inversely with the temperature of the reaction. Thus too short a time allows too much of the monoester to remain in the product and too long a time causes formation of the hydroxy acid. Therefore the hydrolysis reaction is continued under pressure until a sample of the product shows a relative ethylene release value of at least 55 and preferably at least 60 (the relative ethylene value for the pure acid being 82). Hence the period of reaction is defined by use of the ethylene release value defined above.

As indicated above a highly important aspect of the reaction is that it is conducted under autogenous or greater pressure and under the other conditions mentioned. Thus the reaction may be conducted by allowing pressure to build up under the closed system or under superatmospheric pressure ranging up to about 500 p.s.i.g. and preferably up to about 200 p.s.i.g. When operating under autogenous conditions, it will be found that the pressure will fluctuate from about 25 p.s.i.g. up to 100 p.s.i.g. depending of course upon the other conditions of the reaction. It is to be understood however that the reaction must be operated under autogenous or higher pressures for obtaining the optimum results of this invention; this is most significant in providing the advantageous results.

In conducting the reaction the apparatus employed is necessarily of the type which can be sealed in order that the reaction can be conducted under autogenous pressure. For a batch reaction in the laboratory particularly optimum equipment which can be used include sealed glass tubes or glass lined autoclaves of the type well known to the art. Similar apparatus may be used in larger scale reactions. In conducting the reaction, the desired amount of starting material and hydrochloric acid solution are charged to the reactor and heated and stirred at the desired temperatures and pressures. On completion of the reaction the mixture is cooled and the product isolated from the resulting mixture by conventional means.

When conducting the hydrolytic procedure of this invention as outlined above, there results a two-phase system, one system (a) comprising water and 2-chloroethylphosphonic acid, and a second system (b) comprising an ethylene dichloride layer which contains 2-chloroethylphosphonic acid, acid monochloroethyl ester and other impurities in small amounts. According to a novel feature of the invention, by drawing off layer (b), a substantial purification is effected thereby improving the purity and usefulness of the resultant 2-chloroethylphosphonic acid.

The following examples are given to illustrate the process of the invention. In the examples, parts are by weight unless otherwise indicated. In the examples, the desired 2-chloroethylphosphonic acid is abbreviated to "chloroacid."

EXAMPLE I

Six heavy wall glass tubes were each charged with 8.1 grams (0.03 mole) of bis-(2-chloroethyl) 2-chloroethylphosphonate and 9 ml. (0.106 mole) concentrated (37%) hydrochloric acid. The tubes were sealed and then heated at 100° C., with continuous shaking for the indicated length of time (see table). Initially the reaction mixture was homogeneous but a second phase developed during the reaction. The tubes were then cooled, opened and the contents rinsed with benzene and the liquid phases combined. The solvent was removed under vacuum, at steam bath temperature, using a rotating flash evaporator. The residue was analyzed by titration and by treating an aliquot portion with base and injecting this mixture into a gas chromatograph. From the titration there was computed the percent diacid and the percent monoester while the ethylene release value (i.e. the "ethylene value") was obtained by the v.p.c. method, described above. The results are as follows in the table.

| Time (hours) | Residue weight (grams) [a] | Diacid, percent | Monoester, percent | Ethylene value [b] |
|---|---|---|---|---|
| 24 | 5.4 | 39.2 | 50.9 | 0.29 |
| 40 | 5.1 | 56.8 | 36.0 | 0.40 |
| 48 | 5.2 | 63.3 | 32.1 | 0.48 |
| 64 | 5.1 | 76.3 | 19.8 | 0.54 |
| 72 | 4.9 | 79.6 | 16.3 | 0.61 |
| 96 | 4.7 | 88.0 | 11.4 | 0.70 |

[a] Theory: 4.3 grams.
[b] Theory: 0.82.

EXAMPLE II

The procedure in Example I was repeated except the temperature was 110° C.

| Time (hours) | Residue weight (grams) | Percent diacid | Percent mono-ester | Ethylene value |
|---|---|---|---|---|
| 17 | 5.5 | 47.5 | 42.8 | .31 |
| 22 | 5.4 | 54.6 | 38.1 | .39 |
| 25 | 5.5 | 57.7 | 27.9 | .42 |
| 41 | 4.9 | 80.0 | 17.4 | .59 |
| 48 | 4.7 | 86.7 | 11.4 | .64 |
| 65 | 4.5 | 95.8 | 1.0 | .70 |

The 65 hour run was treated with diazomethane and the esterified product injected into a v.p.c. Based on comparative studies of reference compounds, there was found 96.3% chloroacid, 2.4% monoester and 1.3%

hereinafter referred to as the "hydroxy acid."

EXAMPLE III

The procedure in Example I was repeated except the temperature was 120° C.

| Time (hours) | Residue weight (grams) | Percent diacid | Percent mono-ester | Ethylene value |
|---|---|---|---|---|
| 16 | 4.7 | 89.3 | 5.4 | 0.60 |
| 24 | 4.4 | 98.7 | | 0.69 |
| 40 | 4.3 | 104.0 | | 0.65 |
| 48 | 3.2 | 100.7 | | 0.68 |

Examination of the 16 hour and 40 hour run by the diazomethane analytical method of Example II showed the following results:

| Time (hours) | Percent chloro-acid [1] | Percent mono-ester | Percent hydroxy acid [1] |
|---|---|---|---|
| 16 | 83.5 | 13.1 | 3.4 |
| 40 | 89.2 | 1.7 | 9.1 |

[1] Total diacid 86.9% (16 hours) and 98.3% (40 hours).

EXAMPLE IV

The procedure in Example I was repeated except the temperature was 130° C.:

| Time (hours) | Weight (grams) | Percent diacid | Percent mono-ester | Ethylene value |
|---|---|---|---|---|
| 16 | 4.5 | 101.7 | | 0.70 |
| 24 | 4.4 | 104.9 | | 0.65 |
| 72 | 4.7 | 103.7 | | 0.58 |

EXAMPLE V (COMPARATIVE)

A mixture of 53.8 grams (0.2 mole) bis-(2-chloroethyl) 2-chloroethylphosphonate, 50 ml. (0.6 mole) concentrated HCl (37%) and 40 ml. water was refluxed for two days. The ethylene dichloride that was produced was continuously removed. A total of 16.7 ml. was collected (51% of theory). An aliquot was removed from the reaction mixture after a day and the solvent stripped off. A second sample was obtained after two days by solvent stripping. The following results were obtained.

| Time | Percent diacid | Percent mono-ester | Ethylene value |
|---|---|---|---|
| 1 day | 58.1 | 30.0 | 0.37 |
| 2 days | 92.9 | 3.1 | 0.54 |

Analysis of the two days sample by the diazomethane reaction showed: 74.0% chloroacid, 22.4% hydroxy acid (i.e. 96.4% diacid) and 3.5% monoester.

EXAMPLE VI

A solution of 8.8 grams 2-bis-(2-chloroethyl)2-chloroethylphosphonate, (from benzene crystallization) 9 ml. conc. HCl (37%) and 8 ml. of water were sealed in a glass tube and heated for 90 hours at 130° C. At the end of this time the solvent was removed leaving 8.4 grams. Analysis by the diazomethane method showed: 76.6% chloroacid and 23.4% hydroxy acid.

EXAMPLE VII

A one gallon glass lined autoclave was charged with 807 grams (3 moles) bis-(2-chloroethyl) 2-chloroethylphosphonate and 900 ml. concentrated hydrochloric acid. The autoclave was heated, with stirring, for 18 hours at 120° C. The maximum pressure during the run was 84 p.s.i.g. On cooling, a two phase liquid product was isolated. The lower layer was ethylene dichloride and weighed 375 grams. The solvent was removed from the upper aqueous phase by vacuum stripping leaving 427.5 grams (99%) of solid product. Titration showed 98.7% diacid and 0.83% monoester. The ethylene value was 0.68. Analysis by the diazomethane method gave 91.9% 2-chloroethane phosphonic acid, 8.1% hydroxy acid and no monoester.

EXAMPLE VIII

The procedure in Example VII was repeated except that the reaction mixture consisted of 807 grams bis-(2-chloroethyl) 2-chloroethylphosphonate, 900 ml. conc. HCl and 200 ml. water. The pressure fluctuated between 54–88 p.s.i.g. After 24 hours at 120° C. there was isolated 445.5 grams of product which contained 105.5% diacid, no monoester and 0.63 ethylene. The diazomethane method gave 88.6% chloroacid, 2.6% monoester and 8.7% hydroxy acid.

EXAMPLE IX (COMPARATIVE)

In a 500 cc. flask, there was charged the following:

67.4 grams of bis-(2-chloroethyl) 2-chloroethylphosphonate
80 cc. 37% HCl and
80 cc. water.

The mixture was stirred and heated under reflux at 110° C. for 7 days. The solution was freed of water and HCl by evaporation under reduced pressure in a flask evaporator. In this mannner 37.7 grams of a viscous oil was obtained.

The ethylene value had dropped to .39 (compare to Example V). No monoester was found. An acid titration (2-hydroxyethanephosphonic acid plus 2-chloroethylphosphonic acid) gave 105% of theory. This example therefore illustrates a reaction of the prior art and shows the definite advantages of operating under autogenous or greater pressure.

EXAMPLE X

A one gallon glass autoclave was charged with 540 grams (2 moles) of bis (2-chloroethyl) 2-chloroethylphosphonate and 900 ml. of 37% HCl. The autoclave was heated to 110° C. in 3 hours and held at 110° C. for 1 hour. Then the temperature was raised to 115° C. and held for 1 hour and then raised to 120° C. and held for 16 hours. On cooling a 2-phase system was obtained. The lower, ethylene chloride layer, which was deep brown in color was drawn off. The lower phase weighed 291 grams. Stripping this phase gave about 284 grams of ethylene chloride and 6.0 grams tarry residue made up of the toxic monochloroethyl ester of chloroethylphosphonic acid, some chloroethanol, and some highly colored impurities. Stipping the aqueous value of layer under vacuum gave ca. 100% of theory (290 grams) of solid tan crystalline acid. It analyzed 93% 2-chloroethylphosphonic acid, less than 1% of monochloroethyl ester of 2-chloroethylphosphonic acid and less than 1% of hydroxy ethane phosphonic acid, by the diazomethane method.

EXAMPLE XI

The procedure of Example X was repeated except that the reaction was carried out for 18 hours rather than 16 hours. The product analyzed 90.7% 2-chloroethylphosphonic acid, 0.6% mono-2-chloroethyl ester of 2-chloroethylphosphonic acid and 4.6% of 2-hydroxyethylphosphonic acid, by the diazomethane method.

EXAMPLE XII

The procedure of Example X was repeated except that the reaction was carried out for 12 hours rather than 16 hours. The product analyzed 88.1% 2-chloroethylphosphonic acid, 1.2% mono-2-chloroethyl 2-chloroethylphosphonate and 3.3% of 2-hydroxyethylphosphonic acid, by the diazomethane method.

The reaction has been described with reference to certain preferred embodiments. However, the invention is not to be considered as limited thereto as obvious variations will become apparent to those skilled in the art to which the invention pertains.

What is claimed is:

1. A process for the preparation of 2-chloroethylphosphonic acid which comprises treating bis($\beta$-chloroethyl) $\beta$-chloroethylphosphonate under autogenous pressure and a temperature of about 100 to 145° C. with an amount of aqueous hydrochloric acid of about 20 to 45% strength corresponding to about 2.5 to 6 moles of hydrochloric acid per mole of said phosphonate compound, cooling the mixture to obtain a two-phase system containing upper and lower layers, withdrawing the lower phase which comprises primarily ethylene dichloride and recovering the 2-chloroethylphosphonic acid from the upper aqueous layer.

2. A process according to claim 1 wherein the reaction is continued under pressure until a sample of the product shows a relative ethylene release value of at least .55.

3. A process according to claim 1 wherein the temperature ranges from 110 to 130° C.

4. A process according to claim 3 wherein the aqueous hydrochloric acid is of 20 to 37% strength.

5. A process according to claim 4 wherein the reaction is continued until a sample of the product shows a relative ethylene release value of at least 60.

6. A process for the preparation of 2-chloroethylphosphonic acid which comprises reacting bis ($\beta$-chloroethyl) $\beta$-chloroethylphosphonate and 37% aqueous hydrochloric acid under autogenous pressure at a temperature of 110° C. to 120° C., cooling the mixture to obtain a two phase system containing upper and lower layers, withdrawing the lower phase which comprises primarily ethylene dichloride and recovering the 2-chloroethylphosphonic acid from the upper layer, the amount of aqueous hydrochloric acid employed corresponding to about 2.5 to 6 moles of hydrochloric acid per mole of bis($\beta$-chloroethyl)$\beta$-chloroethyl phosphonate.

References Cited

UNITED STATES PATENTS

| | | | |
|---|---|---|---|
| 3,304,330 | 2/1967 | Yoke et al. | 260—502.4 R |
| 3,316,331 | 4/1967 | Sims | 260—502.4 R |
| 3,184,496 | 5/1965 | Baranauckas et al. | 260—502.4 R |

OTHER REFERENCES

Kabachnik et al.: "Chem. Abstracts," vol. 42 (1948), columns 7241-3.

Degering et al.: "An Outline of Organic Chemistry," 3rd ed., 1939, p. 89.

Houben-Weyl: "Methoden der Organischen Chemie," Vierte Auflage, December 1963, p. 352.

HOWARD T. MARS, Primary Examiner

J. E. EVANS, Assistant Examiner

U.S. Cl. X.R.

260—545 P, 633, 652 R, 682, 961, 983, 986